United States Patent [19]

Takatsu

[11] Patent Number: 5,172,260

[45] Date of Patent: Dec. 15, 1992

[54] METHOD FOR PHASE COMPENSATION OF OPTICAL REGENERATOR EQUIPMENT

[75] Inventor: Kazuo Takatsu, Kawaguchi, Japan

[73] Assignee: Fujitsu Limited, Kanagawa, Japan

[21] Appl. No.: 492,131

[22] Filed: Mar. 13, 1990

[30] Foreign Application Priority Data

Mar. 17, 1989 [JP] Japan ..................................... 1-67128

[51] Int. Cl.$^5$ ............................................. H04B 10/02
[52] U.S. Cl. .................................... 359/176; 359/158; 375/3
[58] Field of Search ............... 359/110, 174, 175, 176, 359/177, 179, 158; 375/3, 3.1, 4, 11; 340/425; 455/9

[56] References Cited

U.S. PATENT DOCUMENTS

| | | | |
|---|---|---|---|
| 4,019,048 | 4/1977 | Maione et al. | 359/176 |
| 4,503,532 | 3/1985 | Page | 359/175 |
| 4,586,186 | 4/1986 | Anderson | 359/177 |
| 4,727,592 | 2/1988 | Okada et al. | 359/175 |
| 4,847,831 | 7/1989 | Spiesman et al. | 359/177 |

Primary Examiner—Edward L. Coles, Sr.
Assistant Examiner—Kinfe-Michael Negash
Attorney, Agent, or Firm—Staas & Halsey

[57] ABSTRACT

The present invention concerns the use of optical regenerator equipment for dropping and inserting such things as monitor station data along with a phase compensation method for the regenerator equipment. The optical/electrical converter, which is input with an optical signal, changes it into an electrical signal of first and second parallel data, the first parallel data is input to the multiplexer and the second parallel data is input to the electrical/optical convertor. The clock signal that has been extracted from the optical signal is input to the electrical/optical convertor by using the PLL function which can be an internal of external part of the electrical/optical convertor. The electrical/optical convertor is synchronized with the clock signal, that has been input to it, and changes the various input signals from the multiplexer and optical/electrical convertor into optical signals to output them.

11 Claims, 11 Drawing Sheets

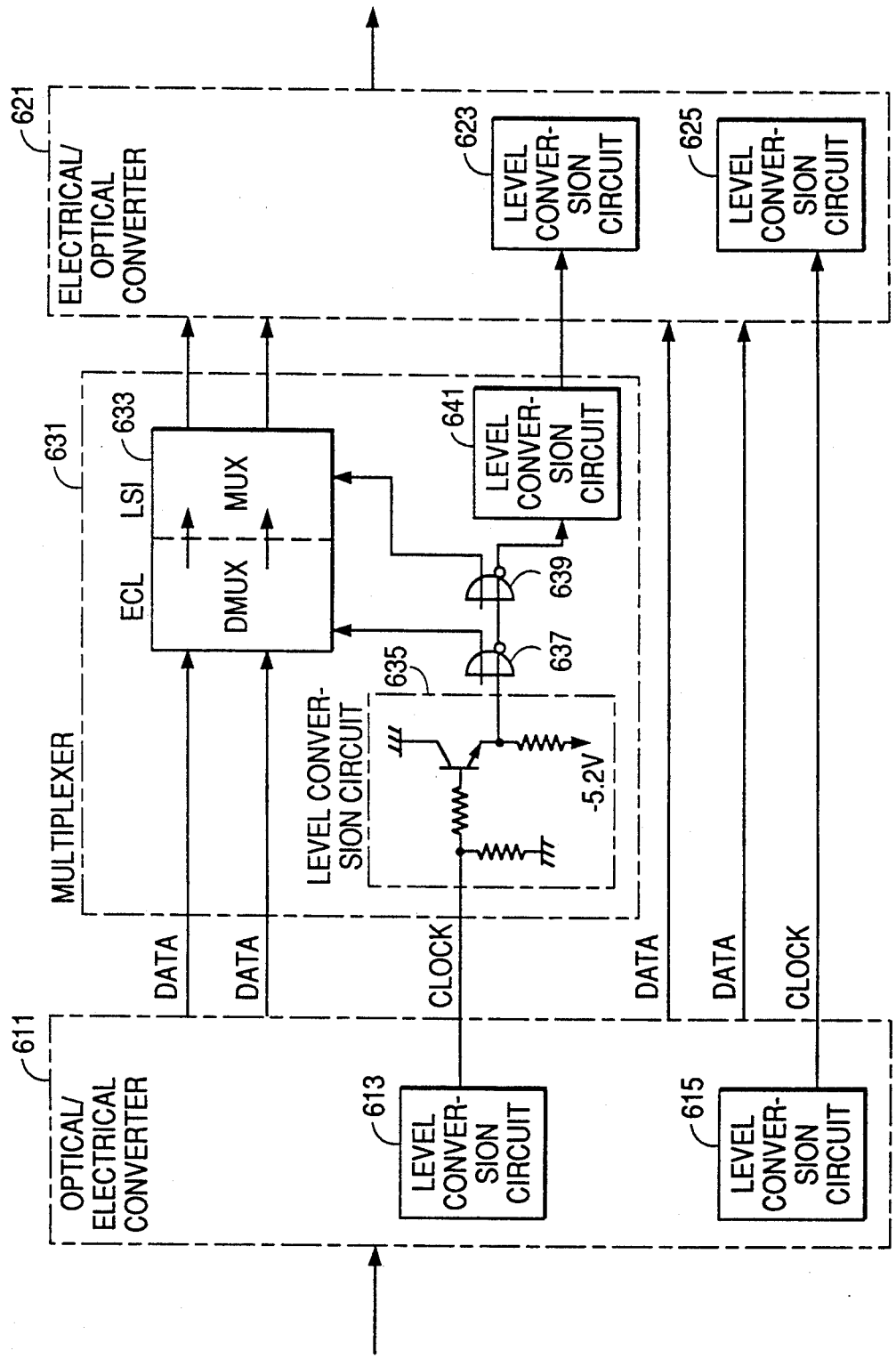

METHOD FOR PHASE COMPENSATION OF OPTICAL REGENERATOR EQUIPMENT

BACKGROUND OF THE INVENTION

1. Field of the Invention

This invention relates to a phase compensation method for regenerator equipment, and particularly, to a phase compensation method for regenerator equipment to compensate the phase of regenerated data in optical regenerator equipment for dropping and inserting monitor station data.

2. Description of the Prior Art

Data links carry out communications between line terminating equipment consisting of data processing equipment and terminal equipment.

Because optical data links are composed of optical fibers, they are virtually free from electrical interference and thus have realized high quality data transmission.

Also because these optical data links have low signal loss, they have the capability to carry out long distance transmissions of several kilometers. If long distance communication is to be carried out between line terminating equipment (for example intercity or intercontinental communications), using optical regenerators as data links makes it possible to lengthen communication range.

FIG. 10 shows the layout of an optical regenerator system which uses optical data links to connect a plurality of line terminating equipment. As the figure shows, 511 and 513 are line terminating equipment, 515 is an optical regenerator equipment, 517 is an optical data link, and 521, 523 and 525 are the monitor control sections. Line terminating equipment 511 and line terminating equipment 513 are connected to optical data link 517 using several units of optical regenerator equipment 515. Also monitor control section 521 monitors line terminating equipment 511 for trouble and monitor control section 521 does the same for line terminating equipment 513. In the same way each optical regenerator equipment 515 of the optical data link 517 are each checked by a plurality of monitor control sections 525 for possible trouble.

FIG. 11 shows the layout of each optical regenerator unit 515. In the drawing, 611 is an optical/electrical convertor, 613, 615, 623, 625, 635 and 641 are level convertor circuits, 621 is an electrical/optical convertor, 631 is a multiplexer, 633 is an ECL-LSI, and 637, 639 are OR-NOR gates. Each optical regenerator equipment 515 has an optical/electrical convertor 611, an electrical/optical convertor 621, and a multiplexer 631.

The optical/electrical convertor 611 changes the optical signal that was input through the optical data link 517 into an electrical signal (digital signal) and also extracts the clock signal. The converted electrical signal (serial data) is changed into parallel data and output from the optical/electrical convertor 611. The development of this technical method makes it possible to convert various data (such as processing by the multiplexer 631 to be covered later and recovery of weak signals) at high speed from optical signals to electrical ones.

Because the input and output of data to and from the optical regenerator equipment is at an extremely high speed and the clock signal must be at least twice that speed, it is necessary to change the input level of the clock in order to protect against reflection occurring. Level convertor circuits 613 and 615 carry out this change in signal. Thus the ECL level clock is converted to 1 V, −1 V level clocks.

After electrical/optical convertor 621 has changed the inputted electrical signal (parallel data) along with the synchronized clock signal from the optical/electrical convertor 611 into serial data, the (now) optical signal is sent to optical data link 517. Because data inside the electrical/optical convertor 621 is handled at ECL levels, the data input to the clock is changed to ECL levels by level convertor circuit 625. A clock is also input from multiplexer 631 and changed to ECL levels by level convertor circuit 623 but this clock is to be used as a spare.

A portion of the parallel data output from optical/electrical convertor 611 and the clock multiplexer signal are entered into electrical/optical convertor 621, by using multiplexer 631. Then, the remainder of the parallel data output from optical/electrical convertor 611 and the clock signal are directly entered into electrical/optical convertor 621.

The multiplexer 631 includes ECL-LSI 633 which carries out multiplexing and demultiplexing of data, level convertor circuit 635 which changes the signal to ECL levels, OR-NOR gates 637, 639 which carry out signal separation of the ECL level clock and level convertor circuit 641 which changes the ECL clock level to 0 V, −1 V levels.

After the clock signal input to the multiplexer 631 is changed to ECL level by the level convertor circuit 635, it is input to ECL-LSI 631 using the OR-NOR gates 637 and 639. By means of ECL-LSI 633, the clock signal isolated out by OR-NOR gate 637 is used for data separation and the clock data isolated by OR-NOR gate 639 is for data multiplexing. ECL-LSI 633 is connected to monitor control section 525 by means of data input/output controller CMOS-LSI (not shown). At the designated position of the synchronized frame (hereinafter called the service channel), data results from monitor control section 525 are inserted and data designated by the monitor section are dropped from the service channel and sent to monitor control section 525.

Generally, the multiplexer 631 is a semiconductor device, and the phase of the data output from the multiplexer varies with the temperature and the voltage. The source of this variation is in the total sum of the delay time by ECL-LSI itself and the delay variation by the level convertor circuit 635 and the OR-NOR gates 637 and 639. FIGS. 12(a) and 12(b) show the switching characteristics of the OR-NOR gates 637, 639 made of Fujitsu-made semiconductor device ECL-IC (model No. MB810A). FIG. 12 (a) shows the temperature dependence of the propagation delay time. FIG. 12 (b) shows the output rise and fall time characteristics as related to temperatures. As the figure shows, when the temperature increases the propagation delay times become longer and the rise and fall times also increase. Level convertor circuit 635 and ECL-LSI 633 show the same trend. There is also a variation in the phase in proportion to a change in voltage.

Factors like those mentioned above cause a difference to occur in the phases between data supplied using multiplexer 631, and data from the combined data of the clock and optical/electrical convertor 611. However the electrical/ optical convertor 621 operates as synchronized with the clock supplied directly from optical/electrical convertor 611, so that the input phase margin of the data input from multiplexer 631 must be maintained.

FIG. 13 shows the state of overall output (for data and clock) phase change of multiplexer 631 due to temperature and voltage. The figure shows respectively, "Power Variations" which are voltage variations, "Delay Time" which is a phase variation, and "temperature variation" which is an operating temperature or ambient temperature variation. As FIG. 13 shows, along with a phase that gets more delayed as the temperature rises, that a higher voltage advances the phase.

FIGS. 14(a) and 14(b) show outlines of the input phase margin of electrical/optical convertor 621. According to the figure, the "Input Phase Margin" is the input phase data tolerance range of electrical/optical convertor 621. If this input phase margin is exceeded a bit data error is generated. Also the data phase change "Delay Time" is shown for data fed from the other unit when the clock fed from either multiplexer 631 or optical electrical convertor 611 is used as a standard.

FIG. 14 (a) shows the input data margin regarding data supplied from the multiplexer when the electrical/optical convertor 621 operates upon being synchronized by the clock fed from optical electrical convertor 611. Accordingly, problems have occurred with the input phase margin disappearing as the temperature falls or the voltage rises.

In FIG. 14 (b), the input phase margin of data directly fed from optical electrical convertor 611 is shown when electrical/optical convertor 621 operates upon being supplied a synchronized signal from the spare clock fed by multiplexer 631. Accordingly, problems have occurred with the input phase margin disappearing completely with a rise in temperature or a drop in voltage.

Because noise-generated data errors occur easily when the phase margin disappears as described, there have been problems with drops in communication efficiency.

SUMMARY OF THE INVENTION

An object of this invention is to ensure an adequate input phase margin against variations in the electrical voltage.

Another object of this invention is to ensure an adequate input phase margin against variations in the temperature.

A still further object of this invention is to raise communications efficiency.

Special features of this invention are carrying out dropping and inserting of data from and into a portion of parallel digital data output from an optical/electrical convertor means and input to an electrical/optical convertor means. The electrical/optical convertor means operates in synchronization with the second clock synchronized in turn by the first clock extracted from the optical signal coming in by the optical/electrical convertor. Because the use or non use of the input/output device for dropping or inserting data causes a disparity in the phase, adjustment of the phase disparity is carried out by a phase synchronizing device.

BRIEF DESCRIPTION OF THE DRAWINGS

FIG. 11 is a drawing showing the particulars of the structure of an optical equipment for an existing embodiment.

DESCRIPTION OF THE PREFERRED EMBODIMENT OF THE INVENTION

Figure 1:
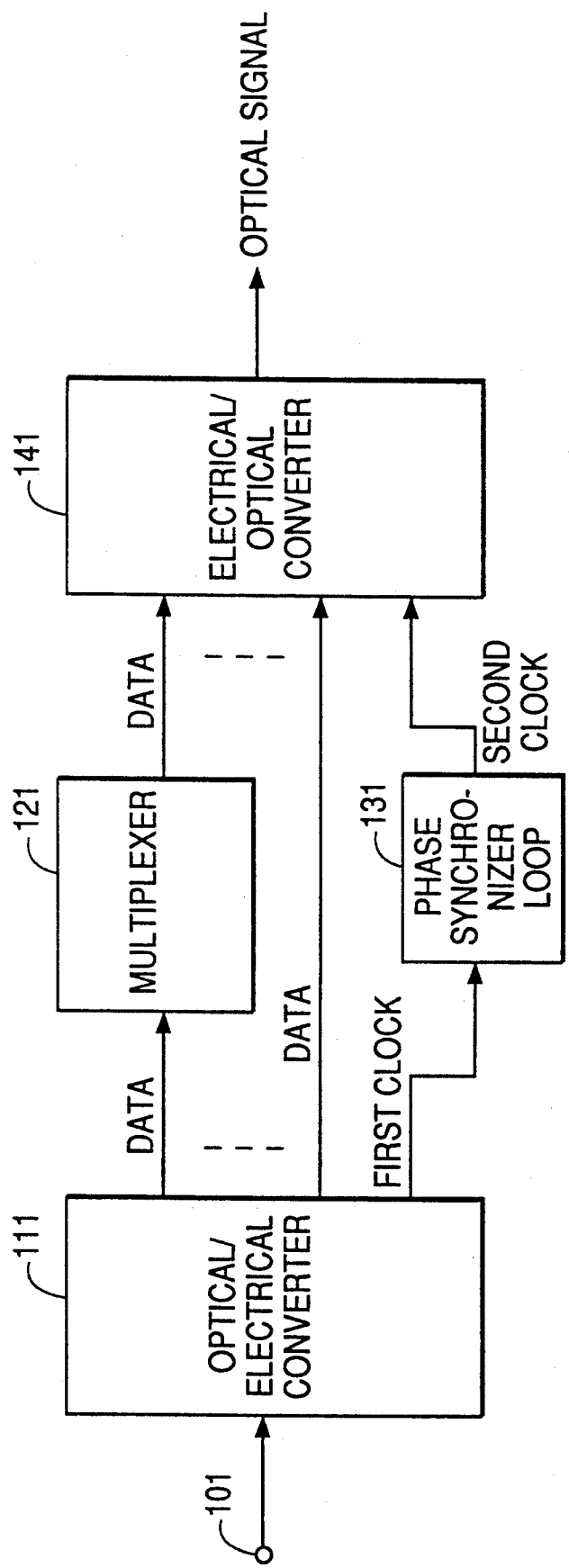
FIG. 1 shows a basic outline of a first embodiment of this invention.

FIG. 1 shows a basic structure of the first embodiment. In the figure, 101 is an input terminal, 111 is an optical/electrical convertor, 121 is a multiplexer, 131 is a phase locked loop (PLL) and 141 is an electrical/optical convertor.

Optical/electrical convertor 111 changes the optical signal through input terminal 101 into an electrical signal and outputs it in the form of parallel data. Also the optical/electrical convertor 111 extracts the clock signal form the optical signal, extracts the clock signal and outputs the clock signal. A portion of parallel data output from optical/electrical convertor 111, is input to electrical/optical convertor 141 using multiplexer 121, and the remainder of the parallel data is directly input to electrical/optical convertor 141. A portion of the data output from optical/electrical convertor 111 is input to multiplexer 121 which drops and inserts all or a portion of the inputted data.

PLL 131 is input with a first clock signal from optical/electrical convertor 111 and outputs a second clock signal.

Electrical/optical convertor 141 is synchronized with the second clock output from PLL 131 and handles the directly input parallel data from optical/electrical convertor 111 along with the output data from multiplexer 121 and changes them into an optical signal.

The following will describe particulars of the structure and operation of the first embodiment above with reference to FIGS. 2 through 8.

Figure 2:
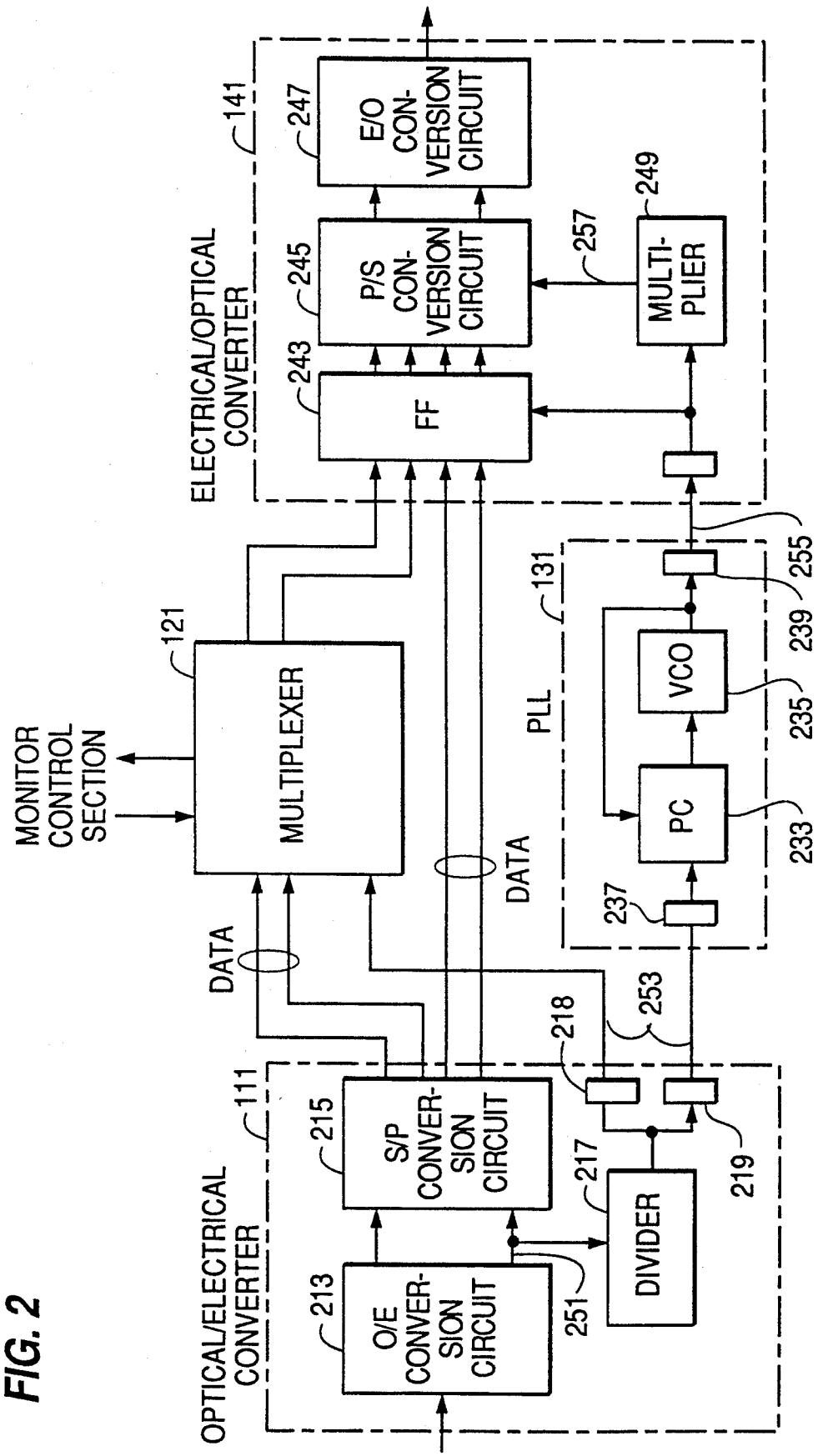
FIG. 2 shows particulars of the first embodiment of the optical regenerator equipment.

FIG. 2 gives a detailed structure of the optical regenerator equipment shown in FIG. 1. In FIG. 2, 213 is an optical/electrical (O/E) convertor circuit, 215 is a serial-parallel (S/P) convertor circuit, 217 is a divider, 218, 219, 237, 239 and 261 are level convertor circuits, 233 is a phase comparator (PC), 235 is a voltage controlled oscillator (VCO), 243 is a flip-flop (FF), 245 is a parallel serial (P/S) convertor circuit, 247 is an electrical/optical (E/O) convertor circuit, 249 is a multiplier, and 251, 253, 255 and 257 are clocks.

Optical/electrical convertor 111 includes 0/E conversion circuit 213, S/P conversion circuit 215, divider 217, and level conversion circuits 218, 219. 0/E conversion circuit 213 converts the optical signal entered in input terminal 101 into the electrical signal at ECL level (serial digital data) and at the same time extracts clock 251 convoluted on the optical signal. S/P conversion circuit 215 synchronize with clock 251 to incorporate the serial data to be input and converts it into 4-bit parallel data. Divider 217 dividing by four the cycle of clock 251, and outputs clock 253 undergone dividing. This clock 253 is an ECL level signal and converted into 0 V, −1 V levels at level conversion circuits 218, 219 respectively, and outputted from optical/electrical convertor 111.

Electrical/optical convertor 141 includes FF 243, P/S conversion circuit 245, E/O conversion circuit 247, multiplier 249, and level conversion circuit 261. The clock 255 input from PLL 131 is changed to a ECL level by means of level conversion circuit 261, and inputted into FF 243 and multiplier 249 respectively. FF 243 is synchronized with clock 255 to keep 4-bit parallel data. P/S conversion circuit 245 changes the 4-bit parallel data into serial data. E/O convertor circuit 247 changes the electrical signal (serial digital data) into an optical signal. After multiplier 249 multiplies the previously divided clock signal 255 four times, the increased signal is output from clock 257.

PLL 131 is provided with PC 233, VCO 235 and level conversion circuits 237 and 239. Level conversion circuit 237 converts the signal level of clock 253 to be input to ECL level and inputs it to PC 233. PC 233 compares the phases of two clocks 253 and 255 to be entered. VCO 235 oscillates in response to the phase comparison's resulting output voltage and outputs clock 255. The signal of outputted clock 255 is changed from an ECL level to 0 V, −1 V level by level conversion circuit 239 and sent to the electrical/optical convertor 141.

The optical signal input on the input terminal 101 is changed into digital data (serial data) by 0/E conversion circuit 213 and then by means of the S/P conversion circuit 215, changed into 4-bit unit parallel data.

S/P conversion circuit 215 is synchronized with clock 251 extracted by 0/E conversion circuit 213 to incorporate each bit of serial data output from 0/E conversion circuit 213. Divider 217 outputs clock 253 from the 251 clock signal divided four times. Then from the S/P conversion circuit 215 synchronized with clock 253, a 4-bit parallel data is output.

Two bits of the 4-bit parallel data output from S/P conversion circuit 215 are input directly to FF 243 in electrical/optical convertor 141, and the other two bits are input to FF 243 through multiplexer 121. Also, the clock 253 signal output from divider 217, is sent to multiplexer 121 and PLL 131 through level conversion circuits 218 and 219.

PC 233 inside PLL 131 carries out phase comparison between clock 253 inputted to one side of its input terminals and the output (output from VCO 235) from PLL 131 entered into the other of the input terminals. A voltage output corresponding to the phase comparison's results is fed to VCO 235. Depending on VCO 235, the output frequency corresponding to the output voltage from PC 23 is given. This output is fed to the other input terminals of PC 233, along with which it is also fed to multiplier 249 and FF 243 using level conversion circuits 239, 261 by way of clock 255. When PLL 131 is operating in ideal conditions, the clock 253 to be entered and the clock signal 255 possessing a prescribed phase difference (fixed phase error) are output from VCO 235.

FF 243 is synchronized with clock 255 and, incorporates and outputs 4-bit parallel data. The P/S conversion circuit 245 is synchronized with clock 257 which had received a signal from clock 255 increased four times by multiplier 249, this is then changed from parallel data to serial data and the serial data is changed into an optical signal by E/O conversion circuit 247 and then output.

Figure 3:
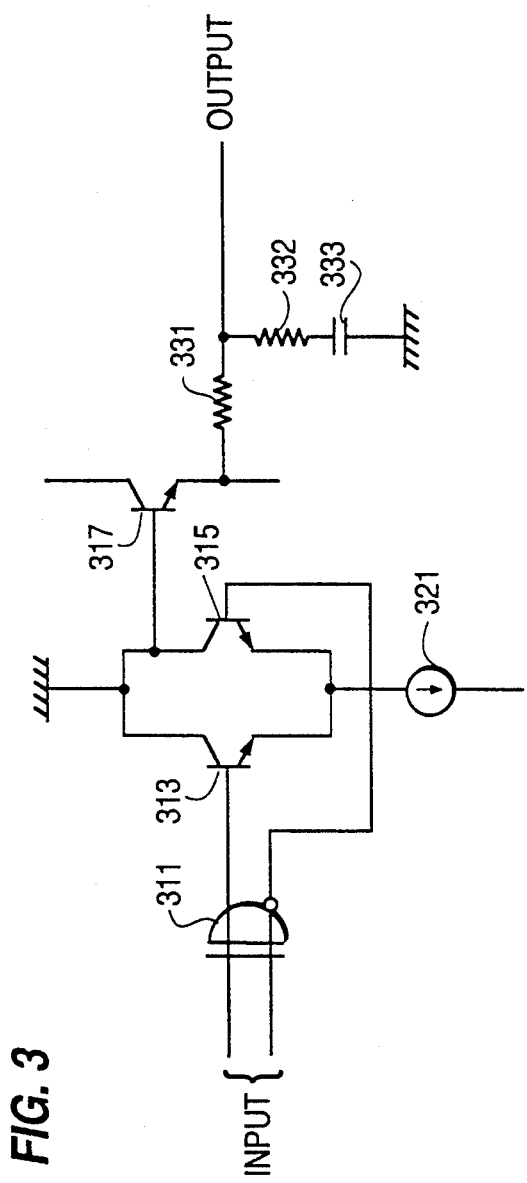
FIG. 3 shows particulars of phase comparator equipment for the first embodiment.

FIG. 3 shows details of the structure of PC 233. In the figure, 311 is an exclusive OR gate, 313, 315 and 317 are transistors, 321 is a stabilized current supply, 331 and 332 are resistors and 333 is a capacitor.

The exclusive OR gate 311 has output pins with complementary outputs. When there is a difference in the phases between clocks 253 and 255 as seen at this logic gate's input terminals, one output terminal of the gate will give a logic "1" signal and the complementary output terminal will give a logic "0". Accordingly with a phase difference in the two clocks, transistors 313 and 315 act alternately and an output comes from the low-pass filter terminating equipment composed of resistors 331, 332 and capacitor 333.

Figure 4:
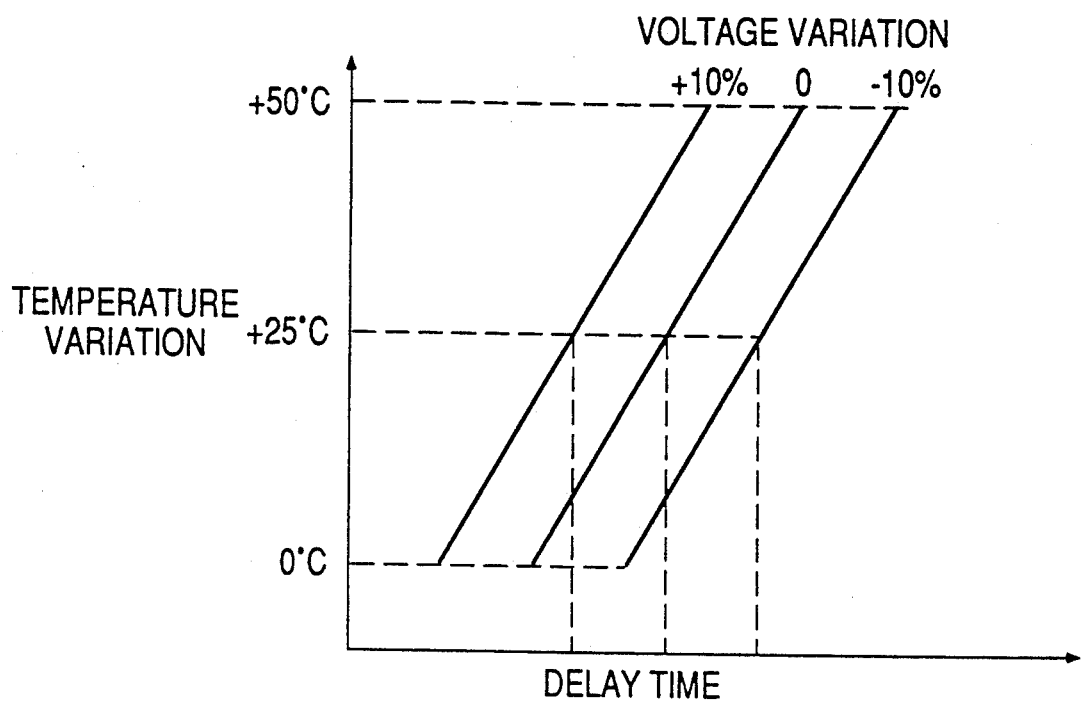
FIG. 4 is a graph of the PLL's fixed phase error difference for the first embodiment.

FIG. 4 shows a fixed phase error of PLL 131. In the figure the output phase difference of clock 255 is shown as "Delay Time", when clock 253 used as a standard, is input to PLL 131. As the figure shows, clock 255 (inputted from PLL 131) has a delayed phase when the temperature climbs or the voltage falls, and as the voltage climbs or the temperature drops, the phase advances.

As a primary factor in variations in the fixed phase difference of PLL 131, a gain variation in direct current loop of PLL 131 can be named. Direct current loop gain $\alpha$ of PLL 131 can be affected by the gain $\alpha_1$ of PC 233, and filter (the low-pass filter terminating equipment as shown in FIG. 3, composed of resistors 331, 332 and capacitor 333) direct current loop gain $\alpha_2$, and direct current loop gain $\alpha_3$ of VCO 235. These accumulated gains $\alpha_1$, $\alpha_2$, $\alpha_3$, can each have their value altered by a voltage variation. Thus direct loop current gain of PLL 131 gets smaller with a decrease in voltage, as a result overall phase difference of PLL 131 gets greater and phase delay occurs. The appearance of this tendency is shown in FIG. 4.

Figure 5:
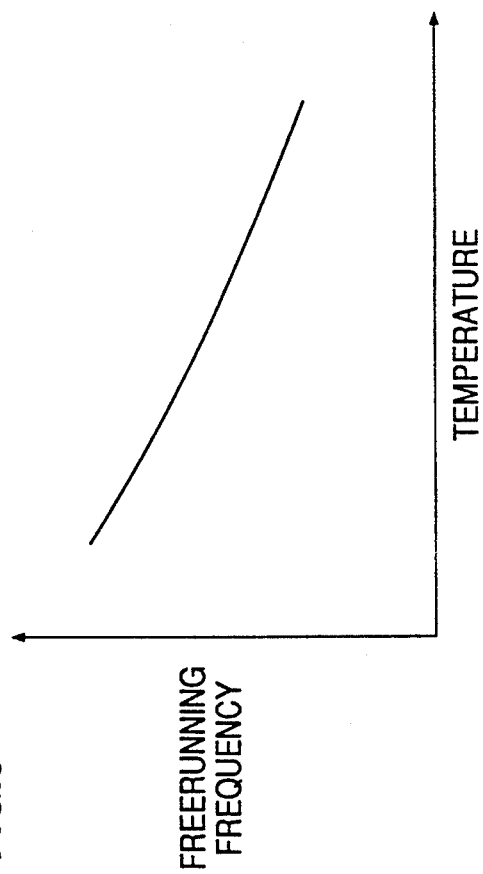
FIG. 5 is a graph showing the special characteristics of free running frequency of a common PLL.

FIG. 5 shows free running frequency temperature dependence characteristics of PLL 131. The figure shows the relation between temperature and the free-running frequency under fixed conditions. These characteristics are known to be common to PLL circuits.

Because the stable state free-running frequency drops when the temperature climbs, PLL 131 inputs a signal such that control voltage of VCO is raised, as a result, the output signal phase of VCO 235 is delayed. In the same way because VCO 235 has its control voltage dropped when the voltage falls, PLL 131 raises the control voltage of VCO 235, as a result the output signal phase of VCO 235 is delayed. Because when the temperature falls, the stable state of the free-running frequency rises, PLL 131 inputs a signal so that the VCO 235 control voltage is lowered. As a result, the output signal phase of VCO 235 advances. In the same way, because the VCO 235 control voltage goes high when the voltage climbs, PLL 131 lowers control voltage of VCO 235 With the result that the output signal phase of VCO 235 is advanced.

Figure 6:
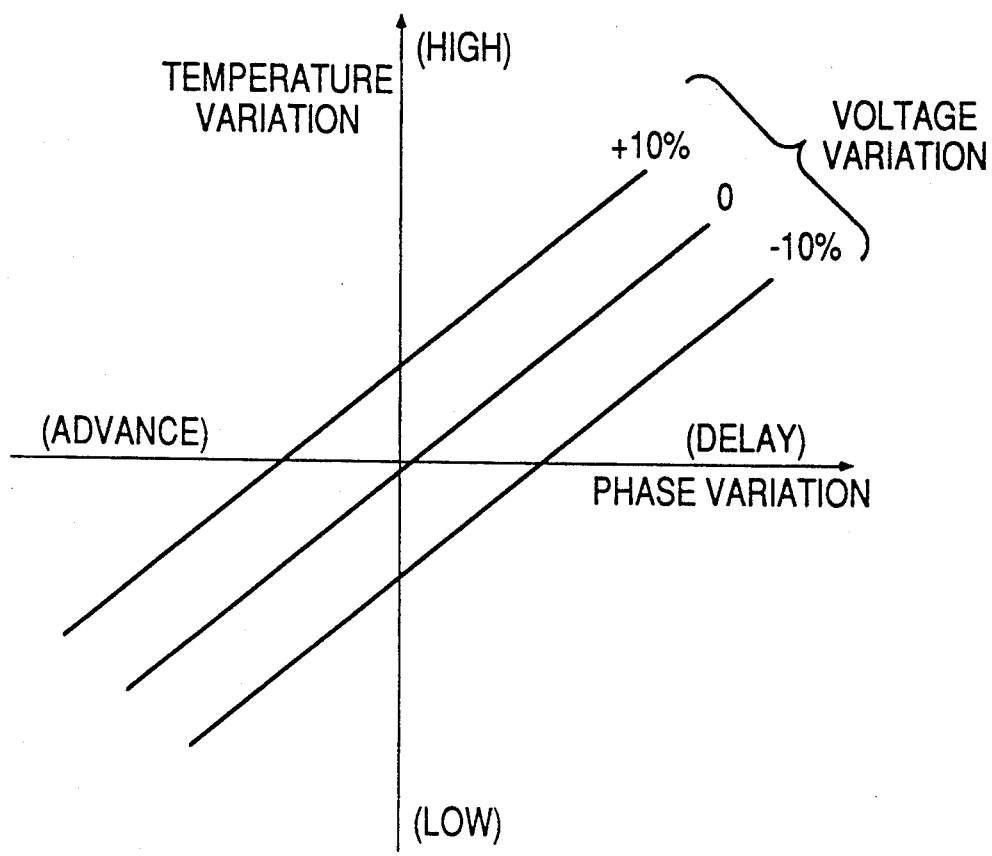
FIG. 6 is a graph showing the VCO output's phase for the first embodiment.
Figure 7A:
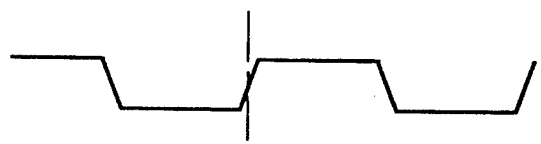
FIGS. 7a-7c show the VCO output's phase delay and phase advance for the first embodiment.
Figure 7B:
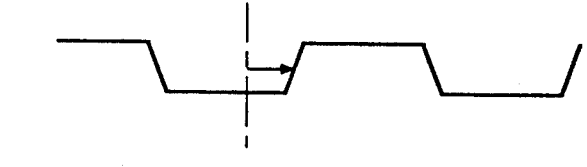
Figure 7C:
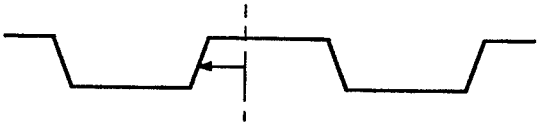

FIG. 6 shows frequency characteristics of the above mentioned VCO 235. In the figure, temperature characteristics of PLL 131 are shown on the vertical axis and the output signal phase variation of VCO 235 is shown on the horizontal axis. Overall characteristics of PLL 131 are the same as those shown in FIG. 4. FIG. 7 shows the output signal phase of VCO 235. FIG. 7 (a) of the drawing shows normal status while FIG. 7 (b) shows a delayed phase angle and FIG. 7 (c) shows an advance phase angle.

Figure 13:
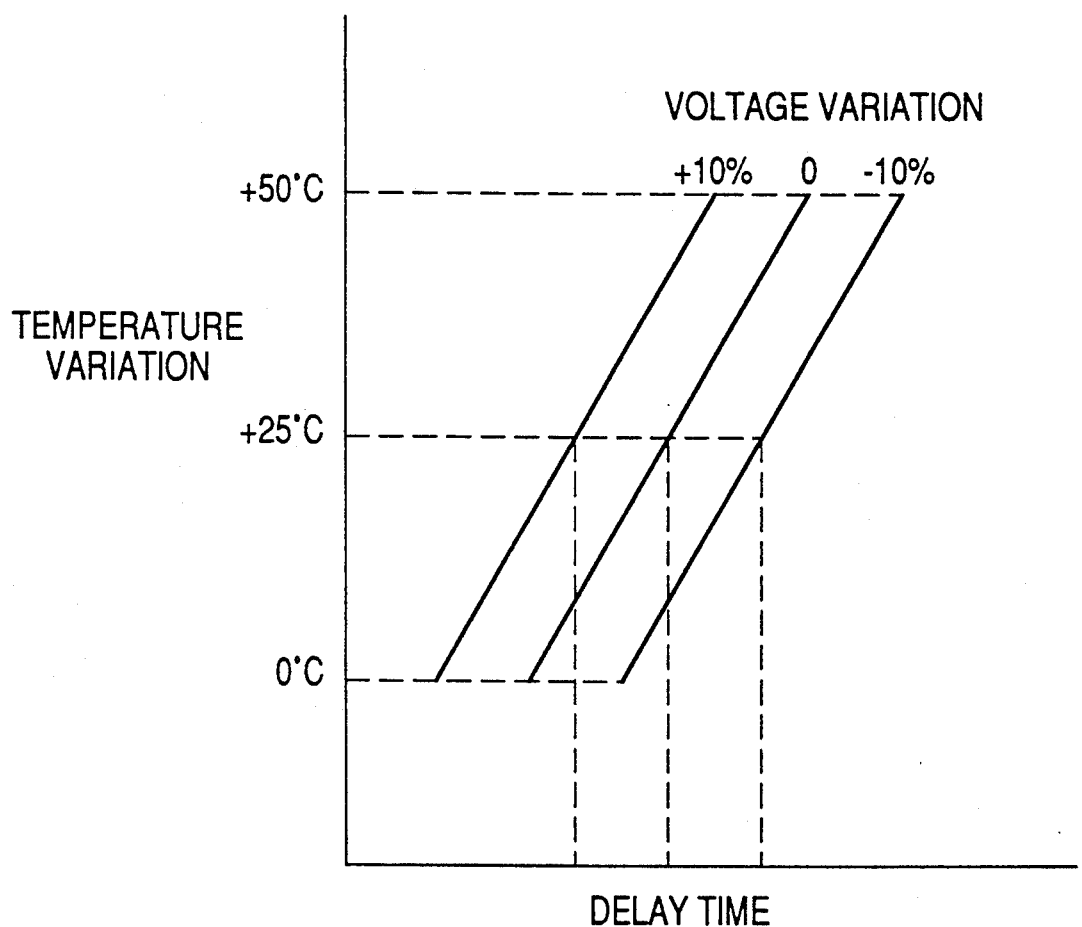
FIG. 13 is a graph showing variations in the multiplexer's data output for the existing embodiment.

As shown in FIGS. 4 and 6, the phase from the output signal of PLL 113 is delayed as the temperature climbs and the phase is delayed as the voltage drops. Because the multiplexer shown in FIG. 13 shows the same trends as PLL 131 for its output data phase variation, by adjusting the phase of clock 255 which is input from PLL 131, an adequate input phase margin for electrical/optical convertor 141 can be assured.

Figure 8:
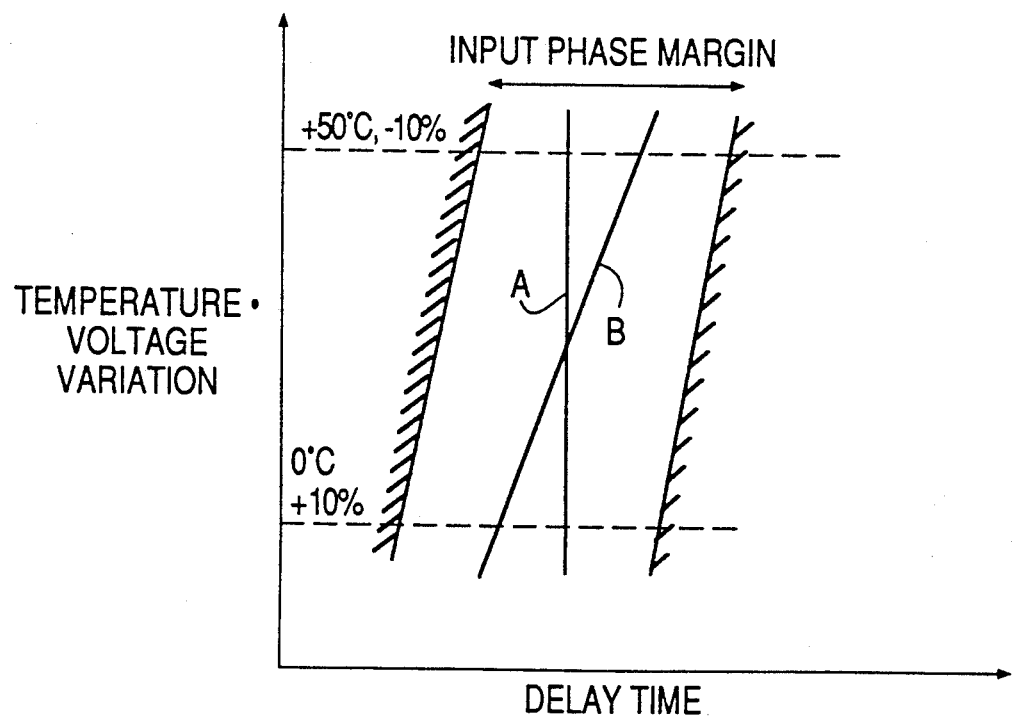
FIG. 8 is a graph showing the input phase margin for the electrical/optical convertor for the first embodiment.
Figure 14A:
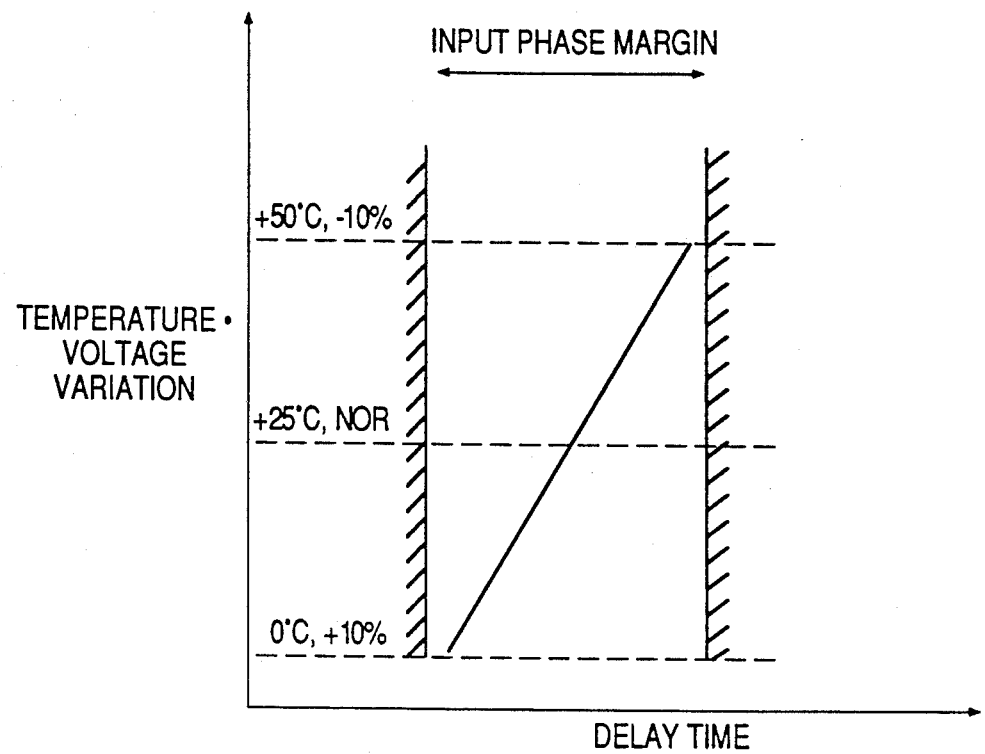
FIGS. 14(a) and 14(b) are graphs showing the input phase margin of the electrical/optical convertor for the existing embodiment.
Figure 14B:
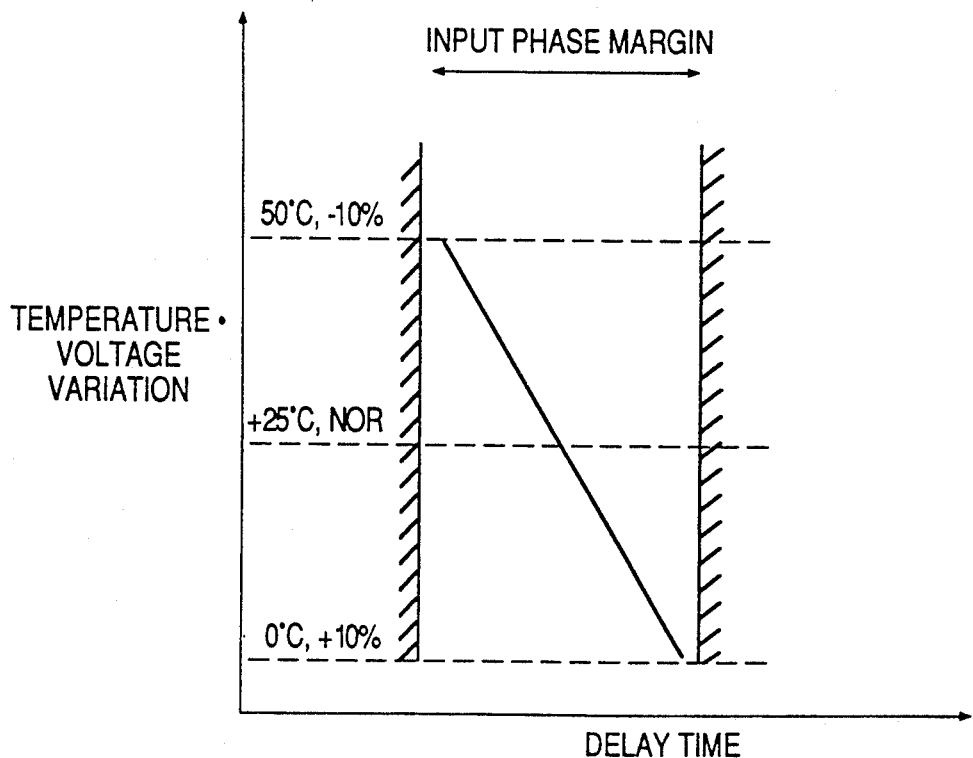

In FIG. 8 the input phase margin of electrical/ optical convertor 141 can be seen. In the figure, the vertical axis is used to show temperature and voltage variations, while the horizontal axis shows the input data delay time of electrical/optical convertor 141. In the middle of the drawing, A is data directly input from the optical-/electrical convertor 111 to electrical/optical convertor 141. B in the drawing shows data input from multiplexer 131 to electrical/optical convertor 141. Regarding a maximum tolerance to be observed for input phase margins, adjust the phase angle, for instance that of the input phase shown in FIG. 14 to be within the limits shown in the parentheses (temp. 0° C. to +50° C., voltage −10% to +10%). For adjusting the input phase margin inclination of FIG. 8, the circuit's loop gain should be altered. Altering the loop gain can be done changing the element constants of the device (for instance in FIG. 3, transistors 313 and 315 or capacitor 333).

Figure 9:
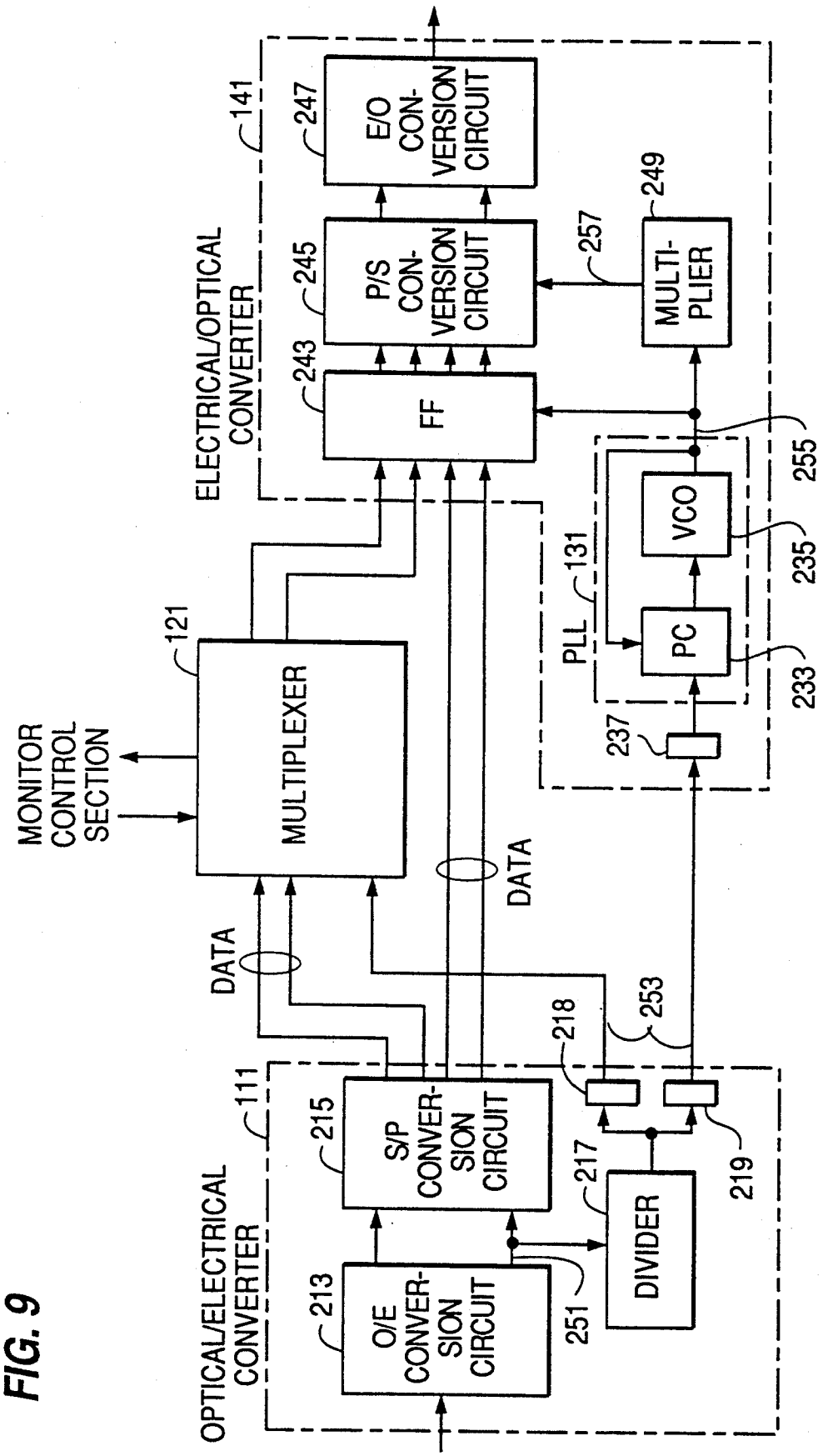
FIG. 9 shows particulars of the second embodiment of this invention.
Figure 10:
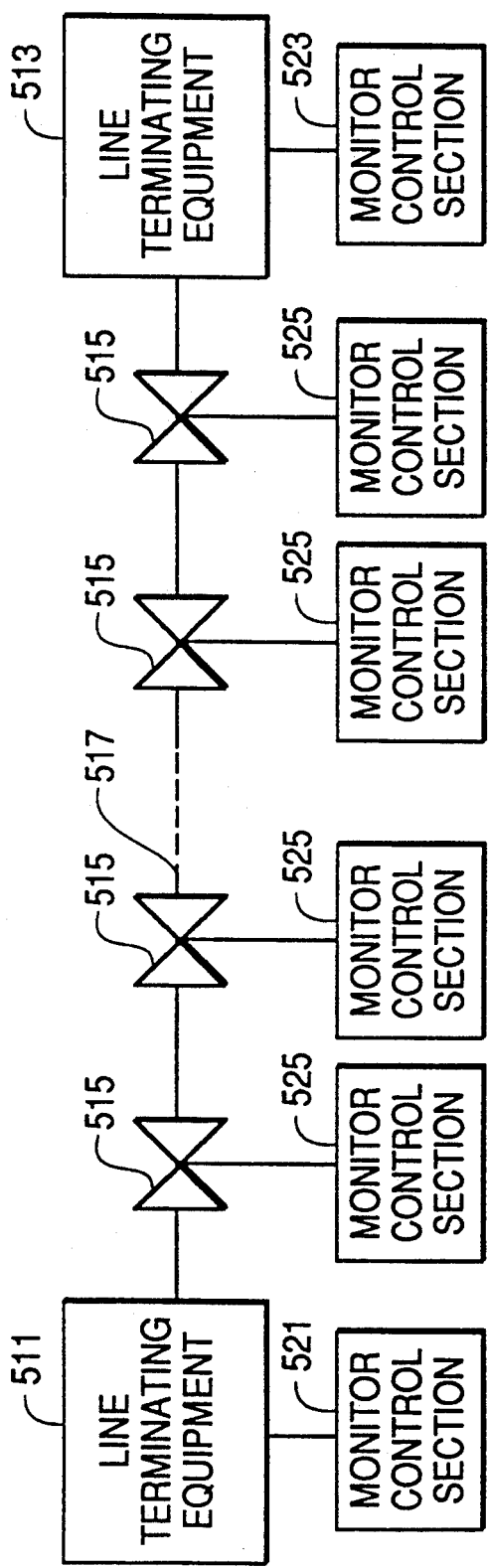
FIG. 10 is a drawing showing the structure of an optical regenerator system for an existing embodiment.
Figure 12A:
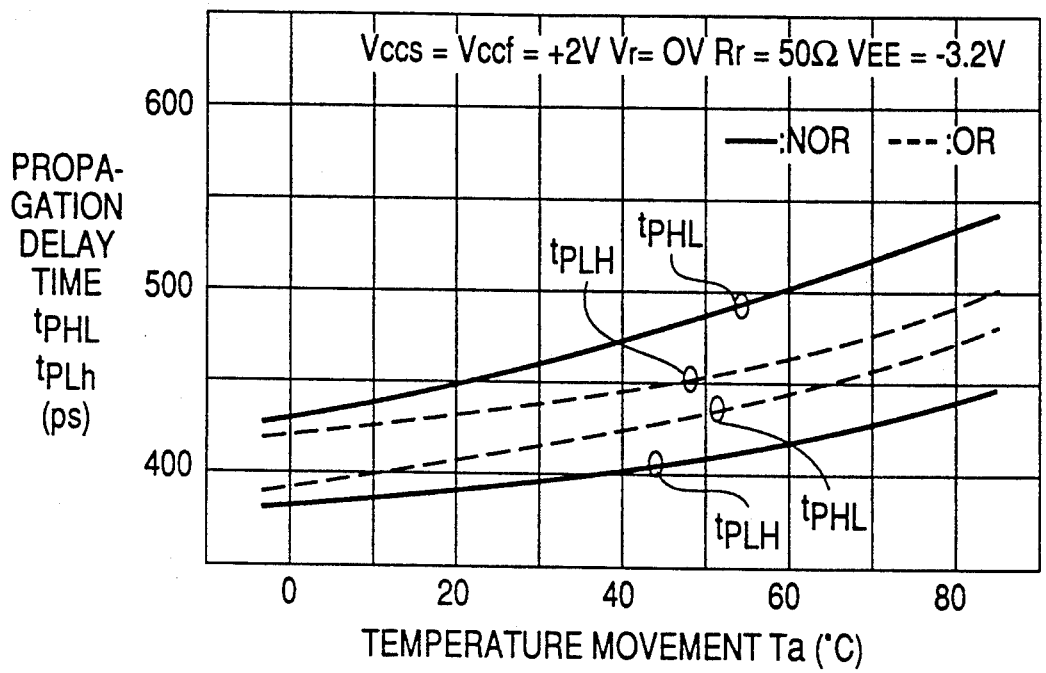
FIGS. 12(a) and 12(b) are graphs showing the OR-NOR gate's special features as related to temperature for the existing embodiment.
Figure 12B:
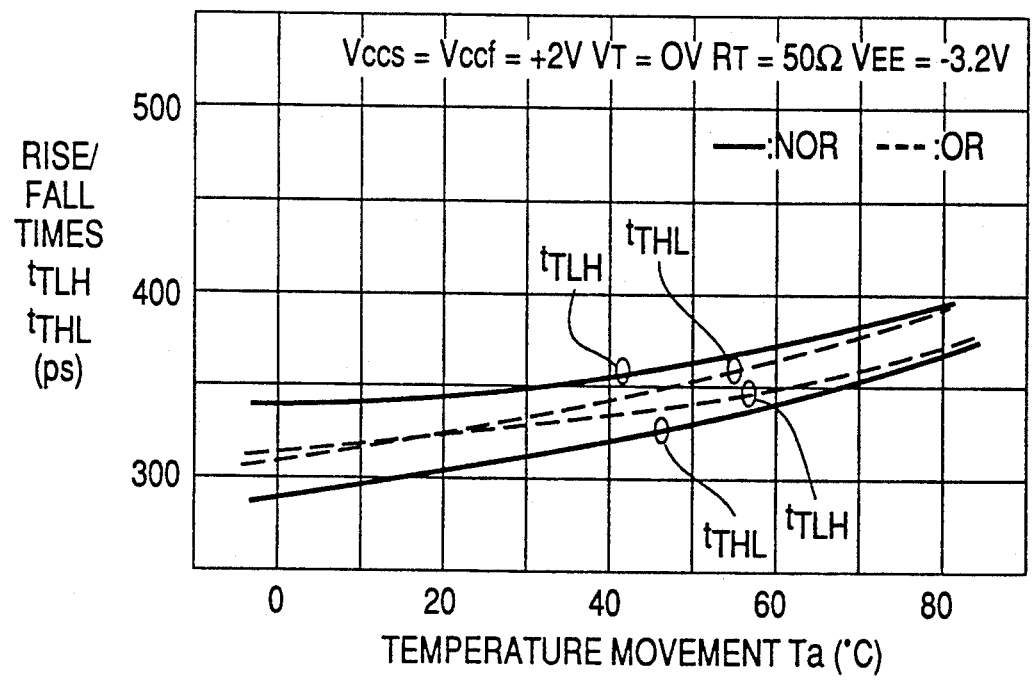

FIG. 9 shows the layout of the second embodiment of the optical regenerator equipment. PLL 131 of FIG. 3, a part of the optical regenerator equipment optical regenerator equipment of the first embodiment, can be seen in FIG. 9 to be included as an interior part of electrical/optical convertor 141. As a result, in the second embodiment, clock 255 can be input and output while still at ECL level, thus it is possible to omit level conversion circuits 239 and 261. The phase variation status of PLL 131 inside electrical/optical convertor 141 is the same as shown for the first embodiment in FIGS. 4 and 6. The input phase margin of electrical/optical convertor 141 can be adjusted to be within the maximum tolerance values for temperature and voltage.

In this way, by adjusting the input phase margins of the optical regenerator equipment of the first and second embodiments, bit error generation can be prevented, and communication efficiency can be raised.

What is claimed is:

1. An apparatus for phase compensation of regenerator equipment, comprising:
   an input in which an optical signal is entered,
   an optical/electrical converter operatively connected to said input to convert the optical signal into a serial electrical signal, to convert the serial electrical signal into first parallel data and second parallel data, and to extract a first clock signal from the optical signal,
   a data input/output circuit operatively connected to said optical/electrical converter to receive the first clock signal and the first parallel data, to selectively drop and insert data from and into the first parallel data and to produce dropped and inserted first parallel data,
   a phase synchronizer operatively connected to said optical/electrical converter to receive the first clock signal and to generate a second clock signal synchronized with the first clock signal, and
   an electrical/optical converter operatively connected to said optical/electrical converter, said data input/output circuit and said phase synchronizer, operating in synchronization with the second clock signal, to incorporate the second parallel data from said optical/electrical converter and the dropped and inserted first parallel data to provide an optical output signal.

2. An apparatus according to claim 1, wherein said phase synchronizer includes a phase locked loop.

3. An apparatus according to claim 1, wherein said optical/electrical converter includes:
   an optical/electrical conversion circuit operatively connected to said input to convert the optical signal from said input into electrical digital data and to extract a basic clock signal,
   a serial/parallel conversion circuit operatively connected to said optical/electrical conversion circuit to convert the electrical digital data from said optical/electrical conversion circuit into the first and second parallel data, and
   a frequency divider operatively connected to said optical/electrical conversion circuit to divide the basic clock signal to produce the first clock signal.

4. An apparatus according to claim 1, wherein said electrical/optical converter includes:
   a flip-flop, operatively connected to said data input/output circuit to maintain the dropped and inserted first parallel data and the second parallel data in synchronization with the second clock,
   a multiplier operatively connected to said phase synchronizer to multiply the second clock by a prescribed number of times to produce a multiplied second clock signal,
   a parallel/serial conversion circuit operatively connected to said flip-flop and said multiplier to convert the parallel data held by said flip-flop into serial data in synchronization with the multiplied second clock from said multiplier, and
   an electrical/optical conversion circuit operatively connected to said parallel/serial conversion circuit to convert an electrical signal corresponding to the serial data outputted from said parallel/serial conversion circuit into the optical output signal.

5. An apparatus for phase compensation of regenerator equipment, comprising:
   input means for receiving an optical signal;
   optical/electrical conversion means for converting the optical signal into a serial electrical signal, for converting the serial electrical signal into first parallel data and second parallel data, and for extracting a first clock signal from the optical signal;
   data input/output means for selectively dropping and inserting data from and into the first parallel data to produce dropped and inserted first parallel data; and
   electrical/optical conversion means for obtaining a second clock signal in synchronization with the first clock signal and in synchronization with the second clock signal, for incorporating the second parallel data and the dropped and inserted first parallel data to produce an optical output signal, and said electrical/optical conversion means including phase synchronization means for maintaining the second clock signal in synchronization with the first clock signal.

6. An apparatus according to claim 5, wherein said phase synchronization means includes a phase locked loop.

7. An apparatus according to claim 5, wherein the optical/electrical conversion means includes:
- an optical/electrical conversion circuit, operatively connected to said input means to convert the optical signal inputted from said input means into electrical digital data and to extract a basic clock signal,
- a serial/parallel conversion circuit operatively connected to said optical/electrical conversion circuit to convert the electrical digital data into the first and second parallel data, and
- a frequency divider operatively connected to said optical/electrical conversion circuit to divide the basic clock signal to produce the first clock signal.

8. An apparatus according to claim 5, wherein said electrical/optical conversion means includes:
- flip-flop operatively connected to said data input/output means to maintain the dropped and inserted first parallel data and the second parallel data in synchronization with the second clock signal,
- a multiplier operatively connected to said phase synchronization means to multiply the second clock signal by a prescribed number of times to produce a multiplied second clock signal,
- a parallel/serial conversion circuit operatively connected to said flip-flop and said multiplier to convert the parallel data held by said flip-flop to serial data in synchronization with the multiplied second clock signal from said multiplier, and
- an electrical/optical conversion circuit operatively connected to said parallel/serial conversion circuit to convert an electrical signal corresponding to the serial data outputted form said parallel/serial conversion circuit into the optical output signal.

9. A method of phase compensation, said method comprising the steps of:
(a) receiving an optical signal;
(b) converting the optical signal into a serial electrical signal;
(c) converting the serial electrical signal to provide first and second parallel data;
(d) extracting a first clock signal from the optical signal;
(e) performing at least one of dropping and inserting data from and into the first parallel data;
(f) generating a second clock signal by phase synchronization with the first clock signal; and
(g) incorporating, in synchronization with the second clock signal, the second parallel data provided in step (c) and the first parallel data provided in step (e) to produce an optical output signal.

10. A method according to claim 9, wherein said extracting in step (d) includes the steps of:
(d1) extracting a basic clock signal from the optical signal
(d2) frequency dividing the basic clock signal to produce the first clock signal.

11. A method according to claim 9, wherein said incorporating, in step (g) includes the steps of:
(g1) maintaining the first and second parallel data in synchronization with the second clock signal;
(g2) multiplying the second clock signal by a predetermined number to produce a multiplied second clock signal;
(g3) converting the first and second parallel data maintained in step (g1) into serial data in synchronization with the multiplied second clock signal; and
(g4) converting the serial data into the optical output signal.

* * * * *